2,846,412

CHLOROETHYLENE POLYMER STABILIZED WITH MONO AND DIFLUOROPHOSPHORIC ACID SALTS

Carl B. Havens, Hope, Mich., assignor to The Dow Chemical Company, Midland, Mich., a corporation of Delaware No Drawing. Application October 22, 1956
Serial No. 617,262

7 Claims. (Cl. 260—45.75)

This invention relates to the thermal stabilization of haloethylene polymers. More particularly it relates to new compositions based on haloethylene polymers having improved thermal stability over the prior known compositions.

It is known that haloethylene polymers, such as polyvinyl chloride and the copolymers of vinyl chloride and vinylidene chloride, undergo appreciable degradation and darkening when heated during thermal fabrication operations and when the fabricated articles are exposed for prolonged periods to elevated temperatures. Such thermal sensitivity has seriously limited the applications in which haloethylene polymers may be employed. One of the common means for alleviating that degradation has been to employ certain additives as heat stabilizers in the polymer formulations. However, the requirements of a suitable heat stabilizer are manifold and varied. It must be compatible with and inert to all elements of the formulation. It must be odor-free and not impart a color to the formulation. It is desirable that it be non-toxic and tasteless. None of the prior heat stabilizers have successfully met all of the above requirements in addition to the primary duty of stabilizing the composition to thermal degradation. In addition, because of the many requirements for heat stabilizers, it is impossible for an investigator to predict the effectiveness of a particular compound as a stabilizer with any degree of certainty, and continuous search is being made for new and more effective stabilizers.

It is accordingly an object of this invention to provide a novel heat stabilized composition based upon haloethylene polymers.

The above and related objects are accomplished with a composition comprising a haloethylene polymer and stabilizing amounts of certain inorganic salts of a phosphoric acid derivative selected from the group consisting of monofluorophosphoric acid and difluorophosphoric acid. Compositions thus prepared show outstanding stability to the degradative effects of elevated temperatures.

Any polymer containing halide groups pendant from the carbon chain may be stabilized with the salts of this invention. As typical examples may be mentioned the polymers of vinyl chloride and vinylidene chloride and the copolymers of vinyl chloride and vinylidene chloride with each other or with another monoethylenically unsaturated monomer, such as acrylonitrile and vinyl acetate. The polymers and copolymers composed predominantly of vinylidene chloride are especially sensitive to thermal exposure and are accordingly preferred subjects for the improvement afforded by the invention.

The stabilizers useful in this invention are the sodium, potassium, lithium, barium, and lead salts of monofluorophosphoric acid or difluorophosphoric acid. Although other inorganic salts, such as the cadmium salt, may be employed, the above salts are unusually effective stabilizers and are preferred. It is well known that certain metals, such as iron, zinc, and copper, have a deleterious effect on haloethylene polymers and the salts of those metals are to be avoided.

The salts are easily prepared from readily available materials. The sodium, lithium, and potassium salts are prepared by stirring sodium, lithium, or potassium hydroxide into an aqueous solution of the acid followed by isolation of the salt by evaporation, distillation or other known solvent removal technique. The barium and lead salts are conveniently prepared by stirring the corresponding chloride into a hot aqueous solution of the sodium salt of the acid. The latter salts are isolated by cooling the solution to room temperature causing crystallization and may be purified by recrystallization from water. The salts are white or only very slightly colored.

The salts of this invention show stabilizing effectiveness when used in an amount of from 0.1 to 5 percent, preferably 0.25 to 2.5 percent, by weight based on the weight of the polymer. When more than 5 percent is used, the stabilizers become economically unattractive, no additional benefits accrue, and the physical properties of articles made from the composition suffer.

These salts are white and odorless so that white or pastel-colored articles may be prepared without their appearance being affected by the stabilizer. Articles prepared from such compositions are more merchantable than those prepared from many of the known compositions due to their absence of odor. Additionally these salts show greater stabilizing effectiveness toward compositions based upon haloethylene polymers than any previously known thermal stabilizer.

The stabilizers of this invention may be employed with the other common additives used in haloethylene polymer formulations without any adverse effects resulting therefrom. Typical of such additives are light stabilizers, fillers, pigments, and dyes.

These stabilizers may be incorporated into the polymer formulations by any known blending technique, such as milling and dry blending. It is preferred that the salt be in a finely comminuted state for blending purposes to achieve uniform dispersion of the salt through the formulation more easily.

The effectiveness and advantages of the salts of this invention as stabilizers will be more apparent from the following illustrative examples wherein all parts and percentages are by weight.

EXAMPLE 1

Sample compositions were prepared by ball-milling 89 parts of a copolymer prepared from 85 percent vinylidene chloride and 15 percent vinyl chloride, 6 parts of tributyl aconitate as a plasticizer, and 2 parts of phenyl salicylate as a light stabilizer. One of the compositions was left unstabilized to heat for comparative purposes. To the others were added 3 parts of each of several stabilizers. The sample compositions were evaluated according to a standard test. In that test a sample of at least 20 grams of the formulation is subjected to a temperature of 178° C. and the pressure of the evolved hydrohalide gas used to determine the degree of thermal degradation. The results are relative to a standard and are reported as "T" values, which are the times in minutes required for the samples to reach a preselected rate of pressure rise. Thus, a more thermally stable composition will have a higher "T" value than a less stable composition. The results are reported in Table I.

*Table I*

| Stabilizer: | "T" value |
|---|---|
| None | 8 |
| Potassium monofluorophosphate | 22 |
| Sodium difluorophosphate | 26 |
| Barium difluorophosphate | 18 |
| Lead difluorophosphate | 15 |

The outstanding stabilizing effectiveness of the salts of this invention is readily apparent from the above results.

EXAMPLE 2

The samples prepared in Example 1 were molded into test specimens having a thickness of 0.10 inch. The original color in all cases was very light. The specimens were exposed to direct weathering in the State of Michigan at about 44° north for 3 months. After one and three months the specimens were examined for color change. These results are listed in Table II.

*Table II*

| Stabilizer | Color after exposure | |
|---|---|---|
| | 1 month | 3 months |
| None | yellow | brown. |
| Sodium difluorophosphate | slight yellow | slight yellow. |
| Barium difluorophosphate | no change | lighter than original. |
| Lead difluorophosphate | lighter than original. | Do. |

The results show that the compositions of this invention are stable to direct weathering for prolonged periods of exposure.

Similar results are observed when the listed salts are employed as stabilizers in compositions based on the polymer of vinyl chloride or others of the defined haloethylene polymers.

I claim:

1. A thermally stable composition comprising a chloroethylene polymer and stabilizing amounts of an inorganic salt of a phosphoric acid derivative selected from the group consisting of the sodium, lithium, potassium, barium, and lead salts of monofluorophosphoric acid and difluorophosphoric acid.

2. The composition claimed in claim 1 wherein said inorganic salt is present in an amount of from 0.1 to 5 percent by weight of said chloroethylene polymer.

3. The composition claimed in claim 1 wherein said chloroethylene polymer is a copolymer composed predominantly of vinylidene chloride.

4. The composition claimed in claim 1 wherein said inorganic salt is potassium monofluorophosphate.

5. The composition claimed in claim 1 wherein said inorganic salt is sodium difluorophosphate.

6. The composition claimed in claim 1 wherein said inorganic salt is barium difluorophosphate.

7. The composition claimed in claim 1 wherein said inorganic salt is lead difluorophosphate.

No references cited.